ically arranged in the same way above the first flash
tank, as this is arranged above the separator. The differen-
tial pressure between the individual tanks amounts also in
this case to 0.3–3 atm., the exact differential pressure
being determined by the composition of the feed gas.
The gas separated in the flash tank or tanks is with-
drawn. In particular cases, especially when a very high
$CO_2$ yield is desired, the gas separated in the first flash
tank and the gas separated in the separator can be re-
compressed and added to the feed gas fed to the scrub-
ber. After leaving the flash tank or tanks the scrubbing
liquid freed from foreign gases to the extent as the desired
purity of the $CO_2$-free scrubbing liquid requires is con-
ducted to the second power recovery turbine. The scrub-
bing liquid is then conducted to the $CO_2$ storage tank
whereby the pressure at the outlet of the power recovery
turbine is only slightly higher than the pressure of the
water column between the power recovery turbine and
the $CO_2$ collecting tank. After separation of the $CO_2$
of the required purity and in the desired amount the
scrubbing liquid is regenerated in the customary way
and pumped back to the scrubber.

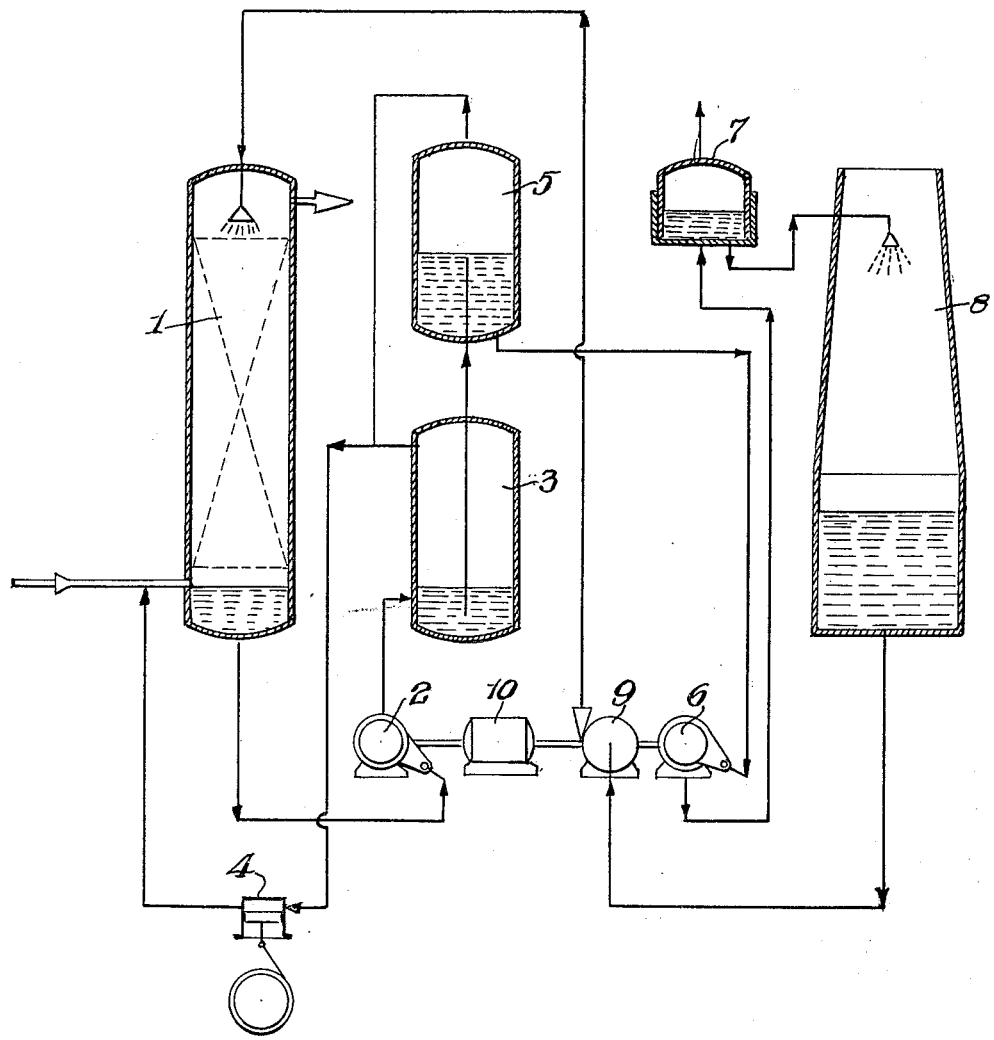

As a further description of the invention we give here
below with reference to the attached drawing a detailed
description of one of the various methods for the realiza-
tion of the process.

3,193,986
PROCESS FOR THE RECOVERY OF $CO_2$ OF VERY HIGH PURITY

Fritz Förster, Dortmund, Germany, assignor to Friedrich
Uhde G.m.b.H., Dortmund, Germany, a corporation
of Germany
Filed Apr. 12, 1961, Ser. No. 102,469
Claims priority, application Germany, Apr. 14, 1960,
U 7,070
3 Claims. (Cl. 55—43)

This invention covers a process for the recovery of
$CO_2$ of high purity by the desorption of scrubbing liquids
used for the scrubbing under pressure of $CO_2$ containing
gases.

The $CO_2$ liberated by the direct flashing of scrubbing
liquids, used for the scrubbing under pressure of $CO_2$
carrying gases, contains besides $CO_2$ all gases, which are
dissolved in the liquid under the conditions prevailing
during the scrubbing process. The $CO_2$ recovered when
e.g. using water under pressure as scrubbing liquid, has
a purity of about 85–90% depending on the composi-
tion of the gas to be scrubbed. For this reason the
$CO_2$ obtained cannot directly be used for processes re-
quiring a high purity of the $CO_2$.

It is an object of this invention to provide a process
which makes it possible to obtain $CO_2$ of a very high
purity and in larger amounts than with the conventional
processes.

It is a further purpose of this invention to obtain the
greatest possible yield of $CO_2$ of high purity while using
only a small amount of energy.

It is a further purpose of this invention to obtain a
high grade $CO_2$ gas in a proven process by flashing the
scrubbing liquid in two steps in two power recovery tur-
bines connected in series and coupled to a scrubbing
liquid pump, in which connection it is essential for the
idea of the invention, that one or more flash steps be
arranged subsequent to the first power recovery turbine.

According to the invention the feed gas is subjected to
a physical scrubbing under a pressure of 5–100 atm.,
preferably of 15–50 atm. in a conventional countercur-
rent scrubber. As scrubbing liquid one of the usual
mediums can be used as e.g. pure water or water mixed
with chemicals increasing the absorptive power of the
water, fluorine containing scrubbing liquids or water-
free absorption agents of organic or inorganic nature.
The scrubbing liquid leaving the scrubbing tower is con-
ducted to a power recovery turbine of known construc-
tion, in which the pressure is reduced by 20–80% de-
pending on the $CO_2$ content of the feed gas. In a sep-
arator arranged immediately downstream of the power
recovery turbine the major part of the gases other than
$CO_2$ contained in the scrubbing liquid is separated. These
gases are withdrawn from the separator. They can be
used depending on the quality of the feed gas which in
turn determines the composition of these gases in a suit-
able process. In particular, in case the $CO_2$ yield should
be very high, the gases can after recompression be re-
turned to the feed gas. The scrubbing liquid coming
from the separator is conducted to an intermediate flash
tank, where the pressure is reduced by 0.3–3 atm. by
means of a relief valve in the feed line to the flash
tank. It is, however, of particular advantage to arrange
the flash tank above the separator which is arranged
downstream of the power recovery turbine and to obtain
the pressure difference without relief valve by the dif-
ference of the static liquid head between separator and
flash tank. This method does not involve any energy
losses caused by the intermediate flashing. The relatively
small amount of gas liberated in the flash tank contains
apart from a small amount of $CO_2$ nearly the total amount
of the other gases dissolved in the scrubbing liquid, so
that the volume ratio of all gases contained in the scrub-
bing liquid is appreciably changed in favour of the
$CO_2$. If certain foreign gases are present it might be
advisable to provide one or more additional flash tanks,
which are for the same energy saving reason advan- In a scrubbing plant 20,000 N.P.T. m.³h. converter
gas containing 26.63% $CO_2$, 3.00% CO, 67.62% $H_2$,
1.75% $N_2$, 0.69% Ar and 0.31% $CH_4$ are scrubbed under
an operating pressure of 28 atm. abs. so that only 0.3%
$CO_2$ is left in the treated gas. Before entering scrubber
1, 1,200 N.P.T. m.³/h. of gas containing 66.3% $CO_2$,
1.8% CO and 31.8% $H_2$ liberated in separator 3 at 8.9
atm. abs. are after being recompressed by means of com-
pressor 4 added to the converter gas. The $CO_2$ content of
the gas increases through the addition of the re-
compressed separator gas from 26.63% in the con-
verter gas to 29% at the inlet of scrubber 1. The gas
laden scrubbing water coming from the bottom of scrubber
1 is flashed in the power recovery turbine 2 to 8.9 atm.
abs., whereby 1,200 N.P.T. m.³/h. gas are obtained in
separator 3. The water coming from separator 3 is
conducted to the elevated flash tank 5 in which at a pres-
sure of 7 atm. abs. 165 N.P.T. m.³/h. of gas containing
79.8% $CO_2$, 1.3%CO, 18.8% $H_2$ are liberated, which are
vented to the atmosphere. For further energy utilization
the water coming from the flash tank is further conducted
to turbine 6 where it is flashed after which it is passed to
the degasification tank 7 near the top of the aerated de-
gasification tower 8. In the degasification tank 7 the
desired pure $CO_2$ is obtained in an amount of 3,802
N.P.T. m.³/h. i.e. 71.3% of the $CO_2$ contained in the
converter gas. The $CO_2$ obtained has a purity of 99.2%.

The water coming from the degasification tank 7 is
freed in degasification tower 8 from the remaining dis-
solved gases according to a conventional method by means
of aeration and is then again conducted to scrubber 1 by
means of pump 9. The difference between the energy re-
quired for driving pump 9 and the energy recovered
through turbines 3 and 6 is supplied by motor 10.

What I claim is:

1. A process for the recovery of $CO_2$ of very high
purity, which comprises scrubbing in a scrubbing stage a
physical gas containing $CO_2$ under a pressure of 5–100
atmospheres with a counter-current stream of a scrubbing liquid selected from the group consisting of water and a mixture of water and a chemical which increases the absorptive power, flashing the scrubbing liquid in a first power recovery turbine to a pressure amounting to 20–80% of the pressure prevailing in the scrubbing stage, conducting the scrubbing liquid to a separator stage, separating flash gas from the scrubbing liquid in said separator stage, discharging the flash gas from the separator stage, transferring the scrubbing liquid to at least one intermediate flashing stage positioned above and connected with said separator stage, said intermediate flashing stage being maintained at a pressure differential of from 0.3 to 3 atmospheres below the pressure in said separator stage by the difference of the static liquid head between the separator stage and the flashing stage whereby the scrubbing liquid is transferred to the flashing stage solely by said pressure differential, separating gas from the scrubbing liquid in said intermediate flash stage, discharging the gas from the intermediate flashing stage, transferring the scrubbing liquid to a second power recovery turbine in which the scrubbing liquid is further flashed, conducting the scrubbing liquid to a degasification tank wherein the $CO_2$ of very high purity is removed, conducting the scrubbing liquid to a degasification tower in which the liquid is freed from the balance of the absorbed gas, and returning the scrubbing liquid to the scrubbing stage by means of a pump, said pump being powered by said first and second power recovery turbines.

2. The process for the recovery of $CO_2$ of very high purity according to claim 1 wherein the gas withdrawn from the separator stage is compressed and added to the feed gas to be fed to the scrubbing stage.

3. The process for the recovery of $CO_2$ of very high purity according to claim 2 wherein the separated gas withdrawn from the first intermediate flash stage is added after compressing together with the gas separated during the separator stage to the feed gas to be fed to the scrubbing stage.

References Cited by the Examiner
UNITED STATES PATENTS

| | | | |
|---|---|---|---|
| 1,836,659 | 12/31 | Gordon | 55—43 |
| 2,926,753 | 3/60 | Kohl et al. | 55—68 X |

REUBEN FRIEDMAN, *Primary Examiner.*

HARRY B. THORNTON, HERBERT L. MARTIN, *Examiners.*